2,855,421

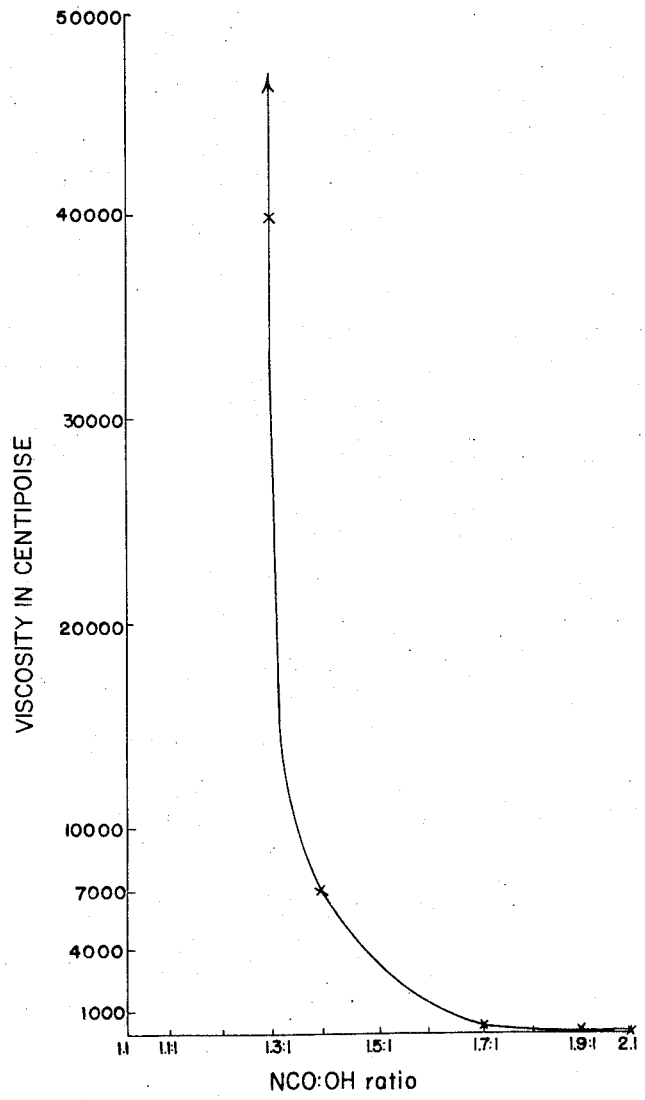

POLYISOCYANATES AND METHOD OF PREPARING POLYISOCYANATES

Wilhelm Bünge, Leverkusen-Wiesdorf, and Otto Bayer, Leverkusen-Bayerwerk, Germany, assignors to Farbenfabriken Bayer Aktiengesellschaft, Leverkusen, Germany, a corporation of Germany Application June 24, 1953, Serial No. 363,914

Claims priority, application Germany July 3, 1952

8 Claims. (Cl. 260—453)

This invention relates to new polyisocyanates and to their manufacture.

Organic polyisocyanates, especially tri- and polyisocyanates, find extensive technical application for making lacquers, plastics and adhesives.

Organic polyisocyanates are, furthermore, valuable intermediates for the production of high molecular weight, insoluble compounds by reacting them for instance with polyhydroxy compounds, polyamines, water or a mixture thereof.

It is known to produce polyisocyanates by reacting diisocyanates and trihydric and tetrahydric alcohols, optionally in admixture with dihydric alcohols; in this reaction, at least one diisocyanate molecule is applied per hydroxyl group of the polyalcohol. The reaction with a trihydric, such as trimethylolpropane or glycerine, leads substantially to the formation of a low molecular weight urethane containing three isocyanate groups, which yields a clear solution and is stable on storage. In the course of the reaction this product containing three isocyanate groups partly reacts with the triol, giving rise to the formation of high molecular weight, soluble polyisocyanates as by-products. Due to this side reaction a part of the diisocyanate used remains unchanged.

When physiologically active diisocyanates—that means volatile products—are employed in the reaction, the adverse effect upon workers, especially sensitive persons, on operating indoors is less than when working with free diisocyanates, but is still appreciable.

We have found that products devoid of the above disadvantage can be obtained from diisocyanates and polyalcohols without affecting the solubility and stability to storage conditions of the product. This is achieved by applying the reactants in the above described reaction in quantitative proportions of more than 1 and less than 2 isocyanate groups per hydroxyl group of the polyalcohol.

According to the invention, higher molecular weight polyisocyanates are substantially obtained and the diisocyanate is converted into the desired, non-volatile polyisocyanate, substantially or completely, depending on the quantitative proportions.

The maximum quantitative proportions depend upon the nature of the polyalcohol used; a diol may be applied in larger quantities than may a triol to obtain products which are still soluble.

Of course it is also possible to employ mixtures of polyalcohols to obtain desired effects.

The limiting value of the quantity of polyalcohol which gives cross-linked products is preferably determined in every case.

Examples of suitable polyalcohols are ethylene glycol, butylene glycol, hexanediol, methyl-hexanediol, diethylene glycol, glycerol, trimethylol ethane, trimethylol propane, 1.2.4-trihydroxy butane, pentaerythritol and triethanolamine. Suitable diisocyanates are for instance tetramethylene diisocyanate, hexamethylene diisocyanate, butane diisocyanate and 4.4'-diphenylmethane diisocyanate.

The new polyisocyanates are preferably produced by introducing the polyalcohol gradually at somewhat elevated temperature into the diisocyanate dissolved in an indifferent solvent, for instance ethyl acetate.

The particular importance of the new polyisocyanates is that due to their increased molecular weight they have substantially no vapor pressure and, therefore, are physiologically harmless. Moreover, they impart, for instance to the lacquer solutions prepared inter alia from polyesters containing hydroxy groups, substantially improved flow properties while leaving the other properties unchanged. Of course the new polyisocyanates may be converted with phenol or malonic ester into addition products which are capable of being decomposed by heat.

The invention is further illustrated by the following examples, the parts being by weight:

Example 1

1000 parts of toluylene diisocyanate in the form of a 50% ethyl acetate solution are reacted by degrees in an oxygen-free atmosphere while stirring at 70° C. with a 50% ethyl acetate solution of a mixture of 85 parts of trimethylol propane and 340 parts of 1.3-butylene glycol (reaction ratio OH:NCO=1:1.22). After combining the solutions and heating to 70° C. for 10 hours an oily light yellow solution containing 2.9% NCO is obtained. The pure substance is calculated to contain 5.6% of NCO. No free toluylene diisocyanate could be detected by analysis. The solution retains its stability under storage conditions for months without its reactivity being affected, and yields valuable, physiologically unobjectionable lacquer solutions in combination with polyesters containing hydroxy groups, which are obtainable by esterifying polybasic carboxylic acids with an excess of polyalcohols.

Example 2

1000 parts of toluylene diisocyanate are dissolved in 333 parts of ethyl acetate and this solution is reacted at 70° C., as described in Example 1, with an alcohol mixture consisting of 240 parts of trimethylol propane and 103 parts of 1.3-butylene glycol dissolved in 114 parts of ethyl acetate (the reaction ratio OH:NCO is 1:1.5). After combining the solutions, 447 parts of toluylene diisocyanate are added so that a 60% solution of the reaction product, which contains 7.2% of NCO, is obtained. After storing for 4 months no decrease in the reactivity could be found by analysis. The solution yields excellent films and coatings with polyesters containing hydroxy groups. By reacting 1000 parts of this 60% solution with 161 parts of phenol at 70° C., a solution is obtained which reacts like a polyisocyanate solution at elevated temperatures in that it splits off phenol.

Example 3

174 parts of toluylene diisocyanate are dissolved in 58 parts of ethyl acetate and reacted gradually while stirring at 50° C. with 79 parts of 1.3-butylene glycol dissolved in 26 parts of ethyl acetate (reaction ratio OH:NCO=1:1.14). The combination of the solutions is controlled so that an internal temperature of 50° C. is maintained. The 75% solution is kept at this temperature for about another 10 hours. A light yellow solution remains which is viscous at room temperature. This contains 4.2% of NCO calculated on the solvent-free product and no free toluylene diisocyanate can be detected in it. In combination with a polyester containing hydroxy groups the solution yields lacquer solutions which are suitable for air-drying and stove drying.

Example 4

600 parts of hexane methylene diisocyanate are dissolved in 200 parts of ethyl acetate and reacted with a solution of 136 parts of trimethylol propane and 58 parts of 1.3-butylene glycol in 65 parts of ethyl acetate at 70° C. as described in Example 1 (reaction ratio OH:NCO=1:1.66). An almost colorless solution containing 15.2% of NCO is obtained, which may be used for the usual reactions with polyhydroxy compounds and, when used alone, represents an excellent adhesive.

Example 5

800 parts of a 75% ethyl acetate solution of toluylene diisocyanate are reacted at 50° C. as described in Example 1 with an alcohol mixture consisting of 93 parts of triethanolamine and 85 parts of 1.3-butylene glycol dissolved in 59 parts of ethyl acetate (reaction ratio OH:NCO=1:1.83). The solution containing 12.7% of NCO yields in combination with stoichiometric proportions of polyhydroxy compounds quick drying coatings of very high stability to chemical influences.

Example 6

By reacting 600 parts of toluylene diisocyanate dissolved in 258 parts of ethyl acetate, as described in Example 1, with a mixture of 59 parts of trimethylol propane, 65 parts of triethanolamine and 50 parts of 1.3-butylene glycol (reaction ratio OH:NCO=1:1.78) a solution of a polyisocyanate containing 12.7% of NCO is obtained, which may be used for the known isocyanate reactions, either as such or in the form of its phenol or malonic ester addition products.

We claim:

1. An improved process of producing a polyisocyanate which comprises reacting (1) a mixture of a trihydric alcohol and a dihydric alcohol, these members being selected from the group consisting of a lower aliphatic dihydric alcohol, a lower aliphatic trihydric alcohol, triethanolamine, and diethylene glycol, with (2) an organic diisocyanate in quantities such that more than 1 and not more than 1.7 isocyanate groups are present per hydroxyl group, the diisocyanate being selected from the group consisting of alkyl, cycloalkyl, aryl, and alkaryl diisocyanates.

2. A polyisocyanate obtained by reacting (1) a lower aliphatic trihydric alcohol with (2) an organic diisocyanate in quantities such that more than 1 and not more than 1.7 isocyanate groups are present per hydroxyl group.

3. A polyisocyanate obtained by reacting (1) a mixture of a trihydric alcohol and a dihydric alcohol, these members being selected from the group consisting of a lower aliphatic dihydric alcohol, a lower aliphatic trihydric alcohol, triethanolamine, and diethylene glycol, with (2) an organic diisocyanate in quantities such that more than 1 and not more than 1.7 isocyanate groups are present per hydroxyl group, the diisocyanate being selected from the group consisting of alkyl, cycloalkyl, aryl and alkaryl diisocyanates.

4. Product of claim 3 wherein the polyisocyanate is prepared by reacting hexamethylene diisocyanate with a mixture of trimethylolpropane and 1,3-butylene glycol.

5. Product of claim 3 wherein the polyisocyanate is the reaction product of toluylene diisocyanate with a mixture of triethanolamine and 1,3-butylene glycol.

6. Product of claim 3 wherein the polyisocyanate is the reaction product of toluylene diisocyanate with a mixture of trimethylolpropane, triethanolamine and 1,3-butylene glycol.

7. Polyisocyanates obtained by reacting a mixture consisting of trimethylol propane and 1,3-butylene glycol with toluylene diisocyanate in a quantity of more than one and not more than 1.7 isocyanate groups per hydroxyl group.

8. Blocked polyisocyanates obtained by reacting a mixture consisting of trimethylol propane and 1,3-butylene glycol with toluylene diisocyanate in a quantity of more than one and not more than 1.7 isocyanate groups per hydroxyl group, and reacting the polyisocyanates thus obtained with phenol in an amount sufficient to bind the free NCO groups contained in said polyisocyanates.

References Cited in the file of this patent

UNITED STATES PATENTS

| | | |
|---|---|---|
| 2,266,777 | Lieser | Dec. 23, 1941 |
| 2,284,637 | Catlin | June 2, 1942 |
| 2,374,136 | Rothrock | Apr. 17, 1945 |
| 2,511,544 | Rinke et al. | June 13, 1950 |
| 2,621,166 | Schmidt et al. | Dec. 9, 1952 |

OTHER REFERENCES

De Bell et al.: "German Plastics Practice" (1946), pp. 300–304.